INVENTOR.
JOHN POLCER
BY Richard S. Shreve
ATTORNEY

Sept. 2, 1969   J. POLCER   3,464,581
MULTI-LAYER PRESSURE VESSEL
Filed March 7, 1968   2 Sheets-Sheet 2
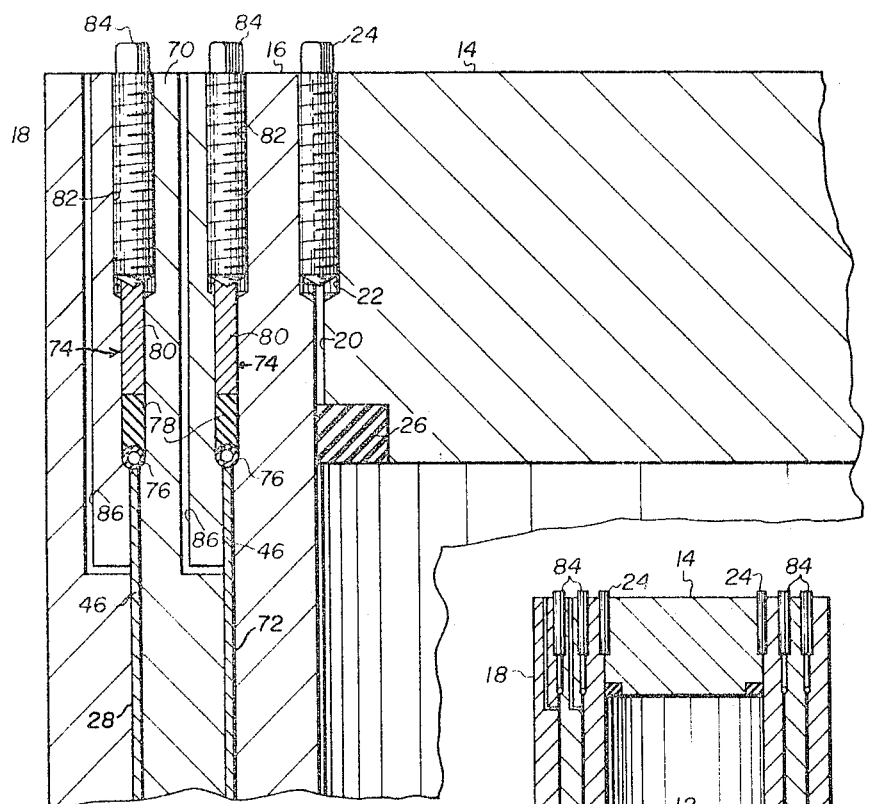
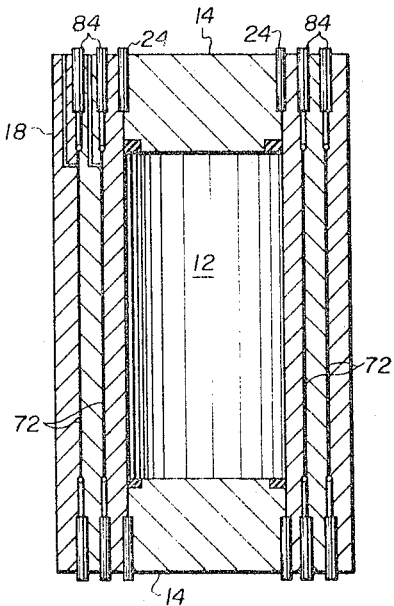
INVENTOR.
JOHN POLCER
BY *Richard S. Shreve, Jr*
ATTORNEY United States Patent Office 3,464,581
Patented Sept. 2, 1969

3,464,581
MULTI-LAYER PRESSURE VESSEL
John Polcer, Florham Park, N.J., assignor to Foster Wheeler Corporation, Livingston, N.J., a corporation of New York
Filed Mar. 7, 1968, Ser. No. 711,451
Int. Cl. B65d 53/02, 25/00
U.S. Cl. 220—46
13 Claims

ABSTRACT OF THE DISCLOSURE

A multi-layer pressure vessel shear stud connected with filler metal between the layers retained by O-rings.

SUMMARY

The high pressure vessel comprises inner and outer cylindrical walls with upper and lower annular grooves therein, spacer means received in said grooves and separating said walls with an annular space therebetween, threaded stud holes centered in said annular space directed from one end of the cylinders, stud bolts in said holes and filler material in said annular space. The spacer means in preferably a segmental ring, and an O-ring is inserted between the ring and annular space to retain filler material for the space.

In the drawings:

FIGURE 3 is a diagrammatic vertical radial cross-section through a three layer modification; and FIGURE 4 is an enlarged detailed section of a portion of FIGURE 3.

Figure 1:
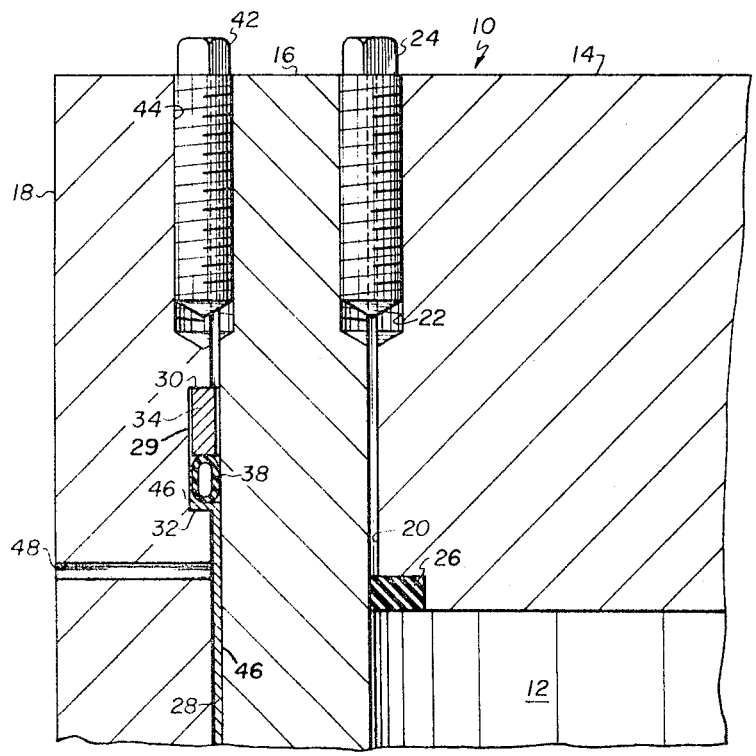
FIGURE 1 is a vertical radial cross-section through a portion of multi-layer pressure vessel according to the preferred embodiment of the present invention.

Referring now to FIGURE 1, a pressure vessel 10 is shown, the interior of which forms a cylindrical chamber 12 therein. The chamber has an end opening for access, which is closed by a plug or head 14 formed by a flat solid disc.

The vessel has an inner cylindrical wall 16 and an outer cylindrical wall 18. The closure plug has an interface 20 between the inner wall 16 and the plug. A plurality of stud holes 22 are drilled in the closure plug and vessel generally longitudinal to and along the clearance space. Each stud hole is partially in the head and partly in the vessel wall, and the stud holes are spaced around the clearance space 20. Threads are formed in the holes and studs 24 with mating threads are inserted into the holes to hold the closure plug in position. In this form the bottom rim of the plug 14 has a groove to receive a compressible gasket 26.

The inner and outer cylinder walls 16 and 18 are spaced apart to form an annular space 28 therebetween. One of these walls, preferably the outer wall 18, is formed with an annular groove 29 adjoining the annular space 28, and the groove 29 is formed with an upper shoulder 30 and lower shoulder 32. The groove 29 receives spacer means, preferably a segmental ring 34 to separate the walls and maintain the annular space 28.

Adjoining the lower shoulder 32, below the ring 34, is an O-ring 38. The annular groove 29 proximate to lower shoulder 32 is correspondingly filled with a filler material 46. The cylinder walls are secured together by stud bolts 42 threaded into holes 44 centered under annular space 28 and distributed therearound. The annular space 28 below the O-ring 38 and the annular groove 29 proximate to lower shoulder 32 are filled with a suitable filler 46, such as oil or filler metal through a passageway 48 from outside the vessel and below the stud bolts 42.

Figure 2:
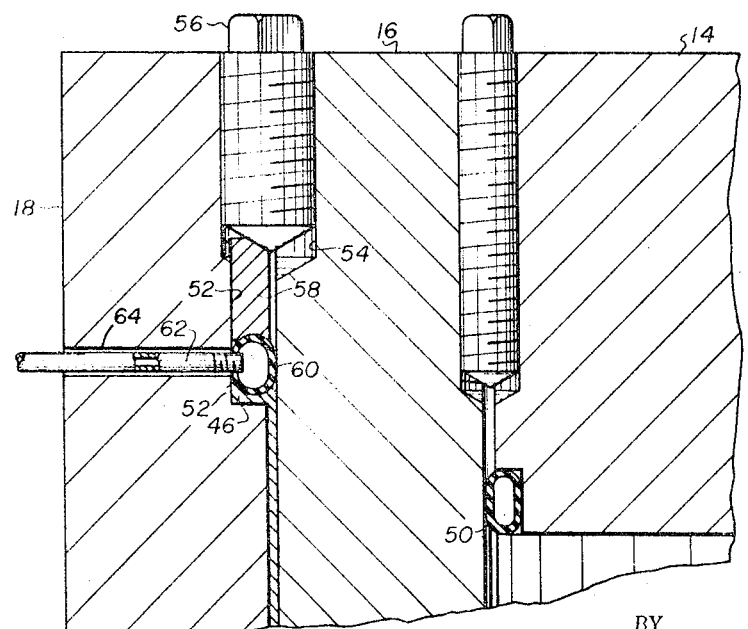
FIGURE 2 is a similar view of a modification.

In the form shown in FIGURE 2, the groove in the rim of the closure plate receives an O-ring 50. The groove 52 in the outer wall 18 intersects the bottom of the shear stud hole 54, so that the bottom of the shear stud 56 engages the top of the segmental ring 58 below which is inserted an O-ring 60. The inside of this O-ring is connected to a pressure tube 62 passing through the outer wall 18. The space below the O-ring is filled with oil or filler metal 46.

Before the outer layer 18 is slid on the inner layer 16 the flexible metal O-ring 60 is placed so that it sets inside the outer layer 18 with the backing ring 58 recessed in the outer layer. The metal O-ring 60 is pressurized by the tube 62. Preferably this tube 62 is put in a groove 64 cut into the outer layer 18, between shear studs 56 which are adjacent one another.

The inner cylinder 16 is then slid in and shear studs put in place. A slight pressure in the inside of the metal O-ring 60 makes the initial seal. When the metal fill 46 is applied between the inner and outer layers the pressure on the inside of the metal O-ring 60 is also increased. Since there will be an additional pressure in operation in the space between the inner and outer layers the frozen pressure inside the O-ring 60 would have to be somewhat larger than frozen pressure between layers for metal fill 46.

In the form shown in FIGURES 3 and 4 the vessel has an intermediate layer 70 separated from the inner and outer layers 16 and 18 by an annular space 72 between inner layer 16 and intermediate layer 70 and annular space 28. The top portions of annular space 28 and annular space 72 are widened to form enlarged grooves 74. The bottoms of the enlarged groove 74 receive O-rings 76 with Teflon or soft metal spacer rings 78 thereabove. Deep hard metal annular rings 80 are fitted down into these grooves on top of the spacer rings 78.

Stud holes 82 are drilled down through the upper parts of the rings 80 and adjacent parts of the respective cylinders, and stud bolts 84 are screwed down therein into the remaining parts of the rings 80. The O-ring 76 in annular space 28 may also be pressurized in a manner similar to the O-ring 60 associated with tube 62 as shown in FIGURE 2, or may be unpressurized. The annular spaces 28 and 72 below the O-rings are filled with oil or filler metal 46 through passages 86 from outside the vessel.

What is claimed is:

1. A pressure vessel comprising inner and outer cylinder walls;
   one of said walls formed with an annular groove therein;
   upper and lower annular spacer means received in said groove and separating said cylinder walls and forming an annular space between said walls;
   said annular space having threaded stud holes therein directed from one end of said cylinders;
   threaded stud bolts screwed into said threaded holes to secure said shells together; and
   filler means applied to said annular groove.

2. A pressure vessel as claimed in claim 1, in which said spacer means comprises a segmental metal ring.

3. A pressure vessel as claimed in claim 1, in which said lower spacer means consist of a gasket which is interposed between said spacer means and said annular groove to retain said filler material.

4. A pressure vessel as claimed in claim 3, in which said gasket is a metal O-ring.

5. A pressure vessel as claimed in claim 1, in which said threaded holes extend into said groove.

6. A pressure vessel as claimed in claim 1, in which an intermediate wall is interposed between said inner and outer walls and said intermediate wall is separated from said inner wall by an annular space.

7. A pressure vessel as claimed in claim 6 in which a first O-ring is positioned in said annular groove, a second O-ring is positioned in said annular space, and said threaded stud holes pass through said annular groove and said annular space in order to contact the first and second O-rings.

8. A pressure vessel as claimed in claim 4, in which the inside of said o-ring is connected to a pressure tube passing through the outer cylinder wall.

9. A pressure vessel as claimed in claim 4, in which said outer wall has a passage between said stud holes from outside of said vessel to supply said filler material.

10. A combined pressure vessel and closure comprising
a hollow inner cylinder open at one end and formed with a circular opening,
a circular head member sized to be received in said opening and forming an inner annular space between said opening and said head member,
said inner cylinder and said head member formed with internally threaded bores along said inner annular space,
a hollow outer cylinder open at one end and sized to coaxially receive said inner cylinder and form an outer annular space between said outer cylinder and said inner cylinder,
said outer cylinder and said inner cylinder formed with internally threaded bores along said outer annular space,
a plurality of externally threaded stud members adapted for threadable engagement with the internally threaded bores,
said outer cylinder having an annular groove adjoining said outer annular space,
annular spacer means positioned in said annular groove, and
filler means applied to said outer annular space and said annular groove in contact with said spacer means such that pressure from said spacer means is transmitted to said filler means.

11. A combined pressure vessel and closure according to claim 10 in which said spacer means comprise a segmental ring having a solid cross sectional area and a ring-shaped gasket having an annular cross sectional area.

12. A combined pressure vessel and closure according to claim 11 in which said filler material consists of a metal fill that is introduced into said outer annular space such that said metal fill comes in contact with said gasket.

13. A combined pressure vessel and closure according to claim 12 in which a lead tube having an inlet and an outlet is connected through said outer cylinder to said outer annular space, with said inlet being exteriorly located with respect to said outer cylinder and said outlet connected to said gasket in fluid communication with the interior thereof, and a source of pressurized fluid connected to said inlet such that said gasket is capable of being pressurized above the operating pressure of said metal fill.

References Cited
UNITED STATES PATENTS

| | | | |
|---|---|---|---|
| 2,903,152 | 9/1959 | Kuo | 220—46 |
| 3,128,001 | 4/1964 | Schmitz | 220—3 |
| 3,266,657 | 8/1966 | Stachiw | 220—46 |

GEORGE T. HALL, Primary Examiner

U.S. Cl. X.R.

220—3